US012668650B2

(12) United States Patent
Canright

(10) Patent No.: US 12,668,650 B2
(45) Date of Patent: Jun. 30, 2026

(54) EXTRUSION BLOW MOLDED ARTICLES AND PROCESSES FOR MAKING SAME

(71) Applicant: ExxonMobil Chemical Patents Inc., Baytown, TX (US)

(72) Inventor: Robert M. Canright, Huffman, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 430 days.

(21) Appl. No.: 17/906,552

(22) PCT Filed: Feb. 22, 2021

(86) PCT No.: PCT/US2021/019059
§ 371 (c)(1),
(2) Date: Sep. 16, 2022

(87) PCT Pub. No.: WO2021/188256
PCT Pub. Date: Sep. 23, 2021

(65) Prior Publication Data
US 2023/0159679 A1     May 25, 2023

Related U.S. Application Data

(60) Provisional application No. 62/991,331, filed on Mar. 18, 2020.

(51) Int. Cl.
| | |
|---|---|
| *C08F 210/02* | (2006.01) |
| *B29C 49/00* | (2006.01) |
| *B29C 49/04* | (2006.01) |
| *B32B 27/08* | (2006.01) |
| *B32B 27/32* | (2006.01) |
| *B65D 1/02* | (2006.01) |
| *B29K 23/00* | (2006.01) |
| *B29K 105/00* | (2006.01) |
| *B29L 31/00* | (2006.01) |

(52) U.S. Cl.
CPC ........ *C08F 210/02* (2013.01); *B29C 49/0005* (2013.01); *B29C 49/0411* (2022.05); *B32B 27/08* (2013.01); *B32B 27/327* (2013.01);

*B65D 1/0207* (2013.01); *B29K 2023/08* (2013.01); *B29K 2105/0014* (2013.01); *B29L 2031/7158* (2013.01); *B32B 2250/24* (2013.01); *B32B 2307/406* (2013.01); *B32B 2307/414* (2013.01); *B32B 2307/72* (2013.01); *B32B 2439/60* (2013.01)

(58) Field of Classification Search
None
See application file for complete search history.

(56) References Cited

U.S. PATENT DOCUMENTS

| | | | | |
|---|---|---|---|---|
| 5,443,868 | A * | 8/1995 | Oda ...................... | B32B 27/32 215/400 |
| 2002/0028340 | A1* | 3/2002 | Fujii ...................... | B29C 48/08 428/141 |
| 2004/0121098 | A1 | 6/2004 | Maziers | |
| 2012/0100356 | A1* | 4/2012 | Ohlsson ................ | B32B 27/327 428/218 |
| 2015/0232589 | A1 | 8/2015 | Best et al. | |
| 2018/0043670 | A1 | 2/2018 | Zhu et al. | |
| 2020/0056004 | A1 | 2/2020 | Zhu et al. | |
| 2021/0246274 | A1 | 8/2021 | Hart et al. | |

FOREIGN PATENT DOCUMENTS

| | | | | |
|---|---|---|---|---|
| WO | WO-2018102091 A1 * | 6/2018 | ................ | C08J 5/18 |

* cited by examiner

*Primary Examiner* — James C Yager
(74) *Attorney, Agent, or Firm* — C. Tumey Law Group PLLC

(57)          ABSTRACT

Extrusion blow molded articles and processes for making same. In some examples, the article can include a polyethylene copolymer derived from ethylene and at least one $C_3$ to $C_{20}$ α-olefin. The polyethylene copolymer can have an $I_{2.16}$ (190° C./2.16 kg) of 0.2 g/10 min to 1 g/10 min, a melt index ratio of 30 to 80, and a density of 0.910 g/cm$^3$ to 0.940 g/cm$^3$. The article can be formed by extrusion blow-molding the polyethylene copolymer. At least one surface of the article can have an average gloss of at least 40.

18 Claims, No Drawings

EXTRUSION BLOW MOLDED ARTICLES AND PROCESSES FOR MAKING SAME

CROSS-REFERENCE OF RELATED APPLICATIONS

This application is a National Phase Application claiming priority to PCT Application Serial No. PCT/US2021/019059, filed Feb. 22, 2021, which claims the benefit of U.S. Provisional Application 62/991,331, filed Mar. 18, 2020 entitled "Extrusion Blow Molded Articles And Processes For Making Same", the entireties of which is are incorporated by reference herein.

FIELD

Embodiments disclosed herein generally relate extrusion blow molded articles and processes for making same. More particularly, such embodiments relate to extrusion blow molded articles that have at least one surface having an average gloss of at least 40 and processes for making same.

BACKGROUND

Extrusion blow molded articles made of thermoplastic materials, e.g., bottles and other containers, have been used to package a wide variety of consumer products such as those in the food, cosmetic, shampoo, and laundry categories. The appearance of such articles can be an important marketing tool. For example, it has been asserted that consumers find plastic bottles and other packaging that has a high gloss, e.g., greater than 40, more appealing than lower gloss packaging.

High gloss high density polyethylene (HDPE) has been used to make such packaging having a high gloss. High gloss HDPE, however, has significant drawbacks in that it is difficult to process and typically the end product has poor mechanical properties, e.g., a very low environmental stress crack resistance.

There is a need, therefore, for improved extrusion blow molded articles having an average gloss of at least 40 and processes for making same.

SUMMARY

Extrusion blow molded articles and processes for making same are provided. In some examples, the article can include a polyethylene copolymer derived from ethylene and at least one $C_3$ to $C_{20}$ α-olefin. The polyethylene copolymer can have an $I_{2.16}$ (190° C./2.16 kg) of 0.2 g/10 min to 1 g/10 min, a melt index ratio of to 80, and a density of 0.910 g/cm$^3$ to 0.940 g/cm$^3$. The article can be formed by extrusion blow-molding the polyethylene copolymer. At least one surface of the article can have an average gloss of at least 40.

In some examples, the process for making the article can include extruding a polymer composition to produce a parison; closing a mold around the parison; injecting a fluid into the mold to inflate the parison against an inner surface of the mold to form the article; and removing the article from the mold. The polymer composition can include a polyethylene copolymer derived from ethylene and at least one $C_3$ to $C_{20}$ α-olefin. The polyethylene copolymer can have an $I_{2.16}$ (190° C./2.16 kg) of 0.2 g/10 min to 1 g/10 min, a melt index ratio of 30 to 80, and a density of 0.910 g/cm$^3$ to 0.940 g/cm$^3$. At least one of an internal surface and an external surface of the article can have an average gloss of at least 40.

DETAILED DESCRIPTION

Various specific embodiments, versions and examples of the invention will now be described, including preferred embodiments and definitions that are adopted herein for purposes of understanding the claimed invention. While the following detailed description gives specific preferred embodiments, those skilled in the art will appreciate that these embodiments are exemplary only, and that the invention may be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

As used herein, the indefinite article "a" or "an" shall mean "at least one" unless specified to the contrary or the context clearly indicates otherwise. Thus, embodiments using "an alpha-olefin" include embodiments where one, two or more alpha-olefins are used, unless specified to the contrary or the context clearly indicates that only one alpha-olefin is used.

As used herein, "wt %" means percentage by weight, "vol %" means percentage by volume, "mol %" means percentage by mole, "ppm" means parts per million, and "ppm wt" and "wppm" are used interchangeably and mean parts per million on a weight basis. All concentrations herein, unless otherwise stated, are expressed on the basis of the total amount of the composition in question.

An, "olefin" is a linear, branched, or cyclic compound of carbon and hydrogen having at least one double bond. For purposes of this specification and the claims appended thereto, when a polymer or copolymer is referred to as including an olefin, e.g., ethylene and at least one $C_3$ to $C_{20}$ α-olefin, the olefin present in such polymer or copolymer is the polymerized form of the olefin. For example, when a copolymer is said to have an "ethylene" content of 35 wt % to 55 wt %, it is understood that the repeating unit/mer unit or simply unit in the copolymer is derived from ethylene in the polymerization reaction and the derived units are present at 35 wt % to 55 wt %, based on a weight of the copolymer.

The term "alpha-olefin" or "α-olefin" refers to an olefin having a terminal carbon-to-carbon double bond in the structure thereof $(R^1R^2)$—C=CH$_2$, where IV and R$^2$ can be independently hydrogen or any hydrocarbyl group. In an aspect, R$^1$ is hydrogen, and R$^2$ is an alkyl group. A "linear alpha-olefin" is an alpha-olefin as defined in this paragraph wherein R$^1$ is hydrogen, and R$^2$ is hydrogen or a linear alkyl group.

A "polymer" has two or more of the same or different repeating units/mer units or units. A "homopolymer" is a polymer having units that are the same. A "copolymer" is a polymer having two or more units that are different from each other. A "terpolymer" is a polymer having three units that are different from each other. The term "different" as used to refer to units indicates that the units differ from each other by at least one atom or are different isomerically. The definition of copolymer, as used herein, includes terpolymers and the like. Likewise, the definition of polymer, as used herein, includes homopolymers, copolymers, and the like. Furthermore, the terms "polyethylene copolymer", "polyethylene", "ethylene polymer", "ethylene copolymer", and "ethylene-based polymer" are used interchangeably to refer to a copolymer that includes at least 50 mol % of units derived from ethylene.

The term "melt index" ("MI") is the number of grams extruded in 10 minutes under the action of a standard load (2.16 kg) and is an inverse measure of viscosity. A high MI implies low viscosity and a low MI implies high viscosity. In addition, polymers can have shear thinning behavior, which means that their resistance to flow decreases as the shear rate increases. This is due to molecular alignments in the direction of flow and disentanglements. As provided herein, MI ($I_2$) is determined according to ASTM D-1238-13, Condition E (190° C./2.16 kg), also sometimes referred to as $I_2$ or $I_{2.16}$.

The term "high load melt index" ("HLMI"), is the number of grams extruded in 10 minutes under the action of a standard load (21.6 kg) and is an inverse measure of viscosity. As provided herein, HLMI ($I_{21}$) is determined according to ASTM D-1238-13, Condition F (190° C./21.6 kg) and is also sometimes referred to as $I_{21}$ or $I_{21.6}$.

The "melt index ratio" ("MIR") provides an indication of the amount of shear thinning behavior of the polymer and is a parameter that can be correlated to the overall polymer mixture molecular weight distribution data obtained separately by using Gel Permeation Chromatography ("GPC") and possibly in combination with another polymer analysis including TREF. MIR is the ratio of $I_{21}/I_2$, or equivalently $I_{21.6}/I_{2.16}$.

Nomenclature of elements and groups thereof used herein are pursuant to the Periodic Table used by the International Union of Pure and Applied Chemistry after 1988. An example of the Periodic Table is shown in the inner page of the front cover of Advanced Inorganic Chemistry, 6th Edition, by F. Albert Cotton et al. (John Wiley & Sons, Inc., 1999).

It has been surprisingly and unexpectedly discovered that a polyethylene copolymer derived from ethylene and at least one $C_3$ to $C_{20}$ α-olefin and having an $I_{2.16}$ (190° C./2.16 kg) of 0.2 g/10 min to 1 g/10 min, a melt index ratio of 30 to 80, and a density of 0.910 g/cm³ to 0.940 g/cm³, can be extrusion blow molded to produce an article having at least one surface that has an average gloss of at least 40, where the average gloss is equal to the sum of the gloss in the machine direction and the transverse direction divided by two (and further where gloss is measured as described below). It has also been surprisingly and unexpectedly discovered that a polyethylene copolymer having units derived from ethylene and at least one $C_3$ to $C_{20}$ α-olefin and having an $I_{2.16}$ (190° C./2.16 kg) of 0.2 g/10 min to 1 g/10 min, a melt index ratio of 30 to 80, and a density of 0.910 g/cm³ to 0.940 g/cm³, can be extrusion blow molded to produce an article having at least one surface that has a gloss of at least 40 in the machine direction. Prior to the inventors producing extrusion blow molded articles with the polyethylene copolymer, it was believed that such articles would have an average gloss of less than 40 and a gloss, in the machine direction, of less than 40.

The gloss of the extrusion blow molded article can be measured using a BYK Gardner Micro-Gloss 45° Reflectometer Model 4535 with a Gardner Gloss meter Calibration Primary Working Standard (S/N 1045268) according to ASTM D2457-13, with the following modifications made to ASTM D2457-13: bottle wall thickness can be from 21 mils to 36 mils. Three specimen samples per bottle can be cut out into a 5×5 inch section and can be mounted flat to the black felt background. Sample mode can be used to measure the three specimens per bottle in both the machine direction (MD) and the transverse directions (TD) direction. The mean of each of the three bottle surface measurements can be reported in both MD and TD orientations; as noted above, the average gloss, in turn, is found by adding the aforementioned MD and TD values and dividing by two.

In some examples, in the extrusion blow molded article having at least one surface that has a gloss of at least 40, i.e., the average gloss and/or the gloss in the machine direction, the at least one surface can have a surface roughness (Ra) of less than 3 μm, less than 2.8 μm, less than 2.6 μm, less than 2.4 μm, less than 2.2 μm, less than 2 μm, less than 1.8 μm, less than 1.6 μm, less than 1.4 μm, less than 1.2 μm, or less than 1 μm. In other examples, in the extrusion blow molded article having at least one surface that has a gloss of at least 40, i.e., the average gloss and/or the gloss in the machine direction, the at least one surface can have a surface roughness (Ra) of about 0.1 μm, about 0.3 μm, about 0.5 μm, about 0.7 μm, or about 0.9 μm to less than 3 μm, less than 2.8 μm, less than 2.6 μm, less than 2.4 μm, less than 2.2 μm, less than 2 μm, less than 1.8 μm, less than 1.6 μm, less than 1.4 μm, less than 1.2 μm, or less than 1 μm.

The surface roughness (Ra) is the arithmetic mean deviation of the assessed profile of the surface. The surface roughness (Ra) can be measured via an optical profilometer, e.g., a Bruker Contour GT-K Optical Profilometer. The optical profilometer X and Y dimensions of an image are fixed by the lens objective/FOY multiplier combination and are not adjustable. The Z-measurement was calibrated using a precision step height standard supplied by Bruker. The certified step height was 7.706+/−0.018 μm and was also used for the SQC. The measured average of 13 runs for Z was 7.709 μm, with a standard deviation of 0.018 μm.

Polyethylene Copolymer

The polyethylene copolymer can include repeating units/mer units or units derived ethylene and units derived from at least one $C_3$-$C_{20}$ α-olefin. In some examples, the polyethylene copolymer can include about 70 mol %, about 80 mol %, about 85 mol %, or about 90 mol % to about 95 mol %, about 96 mol %, about 97 mol %, about 98 mol %, or about 99 mol % of units derived from ethylene, based on a combined weight of the units derived from ethylene and the units derived from the at least one $C_3$-$C_{20}$ α-olefin. In some examples, the polyethylene copolymer can include about 1 mol %, about 1.5 mol %, about 2 mol %, about 2.5 mol %, about 3 mol %, about 3.5 mol %, or about 4 mol % to about 5 mol %, about 7 mol %, about 10 mol %, about 15 mol %, about 20 mol %, or about 30 mol % of units derived from at least one $C_3$-$C_{20}$ α-olefin, based on the combined weight of the units derived from ethylene and the units derived from the at least one $C_3$-$C_{20}$ α-olefin. In other examples, the polyethylene copolymer can include about 80 wt %, about 83 wt %, about 85 wt %, about 87 wt %, about 90 wt %, about 93 wt %, or about 95 wt % to about 96 wt %, about 97 wt %, about 98 wt %, or about 99 wt % of units derived from ethylene and about 1 wt %, about 2 wt %, about 3 wt %, about 4 wt %, about 5 wt %, or about 7.5 wt % to about 10 wt %, about 13 wt %, about 15 wt %, about 17 wt %, or about 20 wt % units derived from $C_3$-$C_{20}$ α-olefins, based on the combined weight of the units derived from ethylene and the units derived from the at least one $C_3$-$C_{20}$ α-olefin.

The $C_3$-$C_{20}$ α-olefin can have a terminal carbon-to-carbon double bond in the structure thereof ($(R^1R^2)$—C=$CH_2$, where $R^1$ and $R^2$ can be independently be hydrogen or any hydrocarbyl group). In some examples, $R^1$ can be hydrogen and $R^2$ can be an alkyl group. The $C_3$-$C_{20}$ α-olefin can be linear or branched. In some examples, the $C_3$-$C_{20}$ α-olefin can be or can include, but is not limited to, propylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 4-methyl-1-pentene, 3-methyl-1-pentene, 5-methyl-1-nonene, 3,5,5-trimethyl-1-hexene, or any mixture thereof. In other examples, the $C_3$-$C_{20}$ α-olefin can be or can include 1-pentene, 1-pentene with one or more methyl, ethyl, or propyl substituents, 1-hexene, 1-hexene with one or more methyl, ethyl, or propyl substituents, 1-heptene, 1-heptene with one or more methyl, ethyl, or propyl substituents, 1-octene, 1-octene with one or more methyl, ethyl, or propyl substituents, 1-nonene, 1-nonene with one or more methyl, ethyl, or propyl substituents, 1-decene, 1-decene with one or more methyl, ethyl, or propyl substituents, 1-dodecene, and/or 1-dodecene with one or more methyl, ethyl, or propyl substituents, or any mixture thereof. In some examples, the $C_3$-$C_{20}$ α-olefin can be or can include, but is not limited to, 1-hexene, 1-octene, or a mixture thereof.

The polyethylene copolymer can have a melt index ($I_{2.16}$) of about 0.2 g/10 min, about 0.23 g/10 min, about 0.25 g/10 min, about 0.27 g/10 min, about 0.3 g/10 min, about 0.33 g/10 min, about 0.35 g/10 min, about 0.37 g/10 min, about 0.4 g/10 min, about 0.43 g/10 min, about 0.45 g/10 min, about 0.47 g/10 min, or about 0.5 g/10 min to about 0.53 g/10 min, about 0.55 g/10 min, about 0.57 g/10 min, about 0.6 g/10 min, about 0.65 g/10 min, about 0.7 g/10 min, about 0.75 g/10 min, about 0.8 g/10 min, about 0.85 g/10 min, about 0.9 g/10 min, about 0.95 g/10 min, or about 1 g/10 min. In some examples, polyethylene copolymer can have a melt index ($I_{2.16}$) of less than 1 g/10 min, less than 0.95 g/10 min, less than 0.9 g/10 min, less than 0.85 g/10 min, less than 0.8 g/10 min, less than 0.75 g/10 min, less than 0.7 g/10 min, less than 0.65 g/10 min, less than 0.6 g/10 min, less than 0.55 g/10 min, less than 0.5 g/10 min, or less than 0.4 g/10 min, or less than 0.35 g/10 min, or less than 0.3 g/10 min. The melt index ($I_{2.16}$) of the polyethylene copolymer and other copolymers can be measured according to ASTM D-1238-13, condition E (190° C., 2.16 kg), and also referred to as "$I_2$ (190° C./2.16 kg)".

The polyethylene copolymer can have a melt index ($I_{21.6}$) of about 10 g/10 min, about 12 g/10 min, about 14 g/10 min, about 16 g/10 min, about 18 g/10 min, about 20 g/10 min, or about 22 g/10 min to about 26 g/10 min, about 28 g/10 min, about 30 g/10 min, about 32 g/10 min, about 34 g/10 min, about 36 g/10 min, about 38 g/10 min, or about 40. The melt index ($I_{21.6}$) of the polyethylene copolymer and other copolymers can be measured according to ASTM D-1238-13, condition F (190° C., 21.6 kg), and also referred to as "$I_{21.6}$ (190° C./21.6 kg)".

The polyethylene copolymer can have a melt index ratio ($I_{21.6}/I_{2.16}$) of at least 30, at least 31, at least 32, at least 33, at least 34, at least 35, at least 36, at least 37, at least 38, at least 39, at least 40, at least 41, or at least 42 to about 50, about 55, about 60, about 65, about 70, about 75, or about 80. In some examples, the melt index ratio ($I_{21.6}/I_{2.16}$) can be greater than 30, greater than 31, greater than 32, greater than 33, greater than 34, greater than 35, greater than 36, greater than 37, greater than 38, greater than 39, or greater than 40 to about 50, about 55, about 60, about 65, about 70, about 75, or about 80.

The polyethylene copolymer can have a density of about 0.910 g/cm$^3$, about 0.913 g/cm$^3$, about 0.915 g/cm$^3$, about 0.917 g/cm$^3$, about 0.920 g/cm$^3$, about 0.923 g/cm$^3$, or about 0.925 g/cm$^3$ to about 0.927 g/cm$^3$, about 0.930 g/cm$^3$, about 0.933 g/cm$^3$, about 0.935 g/cm$^3$, about 0.937 g/cm$^3$, about 0.940 g/cm$^3$, about 0.943 g/cm$^3$, or about 0.945 g/cm$^3$. In some examples, the polyethylene copolymer can have a density of less than 0.940 g/cm$^3$, less than 0.935 g/cm$^3$, less than 0.930 g/cm$^3$, or less than 0.925 g/cm$^3$. The density can be measured using chips cut from plaques compression molded in accordance with ASTM D-1928-96 Procedure C, aged in accordance with ASTM D-618-13 Procedure A, and measured as specified by ASTM D-1505-18. In some examples, the polyethylene copolymer can have a melt index ($I_{2.16}$) of about 0.2 g/10 min to about 1 g/10 min, a melt index ratio ($I_{21.6}/I_{2.16}$) of at least 30 to about 80, and a density of about 0.910 g/cm$^3$ to about 0.940 g/cm$^3$.

In some examples, the polyethylene copolymer can have a molecular weight distribution (Mw/Mn) of about 2, about 2.5, about 3, or about 3.4 to about 4, about 4.5, about 5, about 5.5, about 6, or about 6.5. The molecular weight (weight-average molecular weight (Mw) and number-average molecular weight (Mn) can be determined using Gel Permeation Chromatography. For the GPC data, the differential refractive index (DRI) method is preferred for Mn, while light scattering (LS) is preferred for Mw and Mz. The GPC can be performed on a Waters 150C GPC instrument with DRI detectors. GPC Columns can be calibrated by running a series of narrow polystyrene standards. Molecular weights of polymers other than polystyrenes are conventionally calculated by using Mark Houwink coefficients for the polymer in question.

The polyethylene copolymer can have a Composition Distribution Breadth Index (CDBI) of at least 70%, e.g., about 75% or more, about 80% or more, about 82% or more, about 85% or more, about 87% or more, about 90% or more, about 95%, about 98% or more, about 100%. In some examples, the polyethylene copolymer can have a CDBI of about 70%, about 75%, about 77%, about 80%, or about 82% to about 85%, about 87%, about 90%, about 93%, or about 95%. The CDBI of a copolymer is readily calculated by data obtained from techniques known in the art, such as, for example, temperature rising elution fractionation as described, for example, in U.S. Pat. No. 5,008,204; and in Wild et al., J. Poly. Sci, Poly. Phys. Ed., vol. 20, p. 441 (1982).

The polyethylene copolymer can have long-chain branches. Long-chain branches represent the branches formed by reincorporation of vinyl-terminated macromers, not the branches formed by incorporation of the comonomers. The number of carbon atoms on the long-chain branches can be from a chain length of at least one carbon more than two carbons less than the total number of carbons in the comonomer to several thousands. For example, a long-chain branch of a polyethylene copolymer that includes units derived from ethylene and hexene can be at least five (5) carbons in length (i.e., 6 carbons less 2 equals 4 carbons plus one equals a minimum branch length of five carbons for long-chain branches). In some examples, the polyethylene copolymer can have a 0.05, or 0.1, or 0.2 to 0.3, 0.4, 0.5, or 1 long-chain branches per 1000 carbon atoms. Ethylene-based polymers having levels of long-chain branching greater than 1 long-chain branch per 1000 carbon atoms may have some beneficial properties, e.g., improved processability, shear thinning, and/or delayed melt fracture, and/or improved melt strength.

Various methods are known for determining the presence of long-chain branches. For example, long-chain branching can be determined using $^{13}C$ nuclear magnetic resonance (NMR) spectroscopy. Although conventional $^{13}C$ NMR spectroscopy cannot determine the length of a long-chain branch in excess of about six carbon atoms, there are other known techniques useful for quantifying or determining the presence of long-chain branches in polyethylene copolymers such as a polyethylene copolymer that includes ethylene derived units and 1-octene derived units. For those ethylene-based polymers where the $^{13}$C resonances of the comonomer overlap completely with the $^{13}$C resonances of the long-chain branches, either the comonomer or the other monomers (such as ethylene) can be isotopically labeled so that the long-chain branches can be distinguished from the comonomer. For example, a copolymer of ethylene and 1-octene can be prepared using $^{13}$C-labeled ethylene. In this case, the resonances associated with macromer incorporation will be significantly enhanced in intensity and will show coupling to neighboring $^{13}$C carbons, whereas the octene resonances will be unenhanced.

The short chain branching (SCB) can be measured by hydrogen nuclear magnetic resonance (HNMR) with data collected at 500 Mhz. The spectra can be referenced by setting the polymer backbone signal to 1.347 ppm. The methyl group content in ethylene 1-olefin copolymers can be calculated from the HNMR spectrum using the following formula: Methyl Groups/1000 Carbons=$(I_{CH3}*0.33*1000)/(I_{0.5-2.1\ ppm}*0.5)$, where Ian is the normalized methyl signal area in the region between 0.88 and 1.05 ppm and $I_{0.5-2.1\ ppm}$ is the area between 0.50 and 2.10 ppm. The amount of methyl groups corresponds to the number of short chain branches in the polymer assuming that the short chain branches contain 1 methyl ($—CH_3$) group and that all methyl groups are a result of short chain branching. The same NMR method can be used to determine vinyl end unsaturation.

In some examples, a relationship between a 1% secant modulus (M) of the polyethylene copolymer and a dart impact strength (DIS) of the polyethylene copolymer can comply with the formula: $DIS \geq 0.8 \times [100+e^{(11.71-0.000268M+2.183\times10^{-9}\times M^2)}]$, where e is the base Napierian logarithm, M is the averaged modulus of the polyethylene copolymer in psi, and DIS is the 26 inch dart impact strength of the polyethylene copolymer in g/mil. In some examples, a relationship between the 1% secant modulus (M) of the polyethylene copolymer and the dart impact strength (DIS) of the polyethylene copolymer can comply with the formula: $DIS \geq 2.0 \times [100+e^{(11.71-0.000268M+2.183\times10^{-9}\times M^2)}]$, where e is the base Napierian logarithm, M is the averaged Modulus of the polyethylene copolymer in psi, and DIS is the 26 inch dart impact strength of the polyethylene copolymer in g/mil.

In some examples, the polyethylene copolymer can have a melt index ($I_{2.16}$) of about 0.2 g/10 min to about 1 g/10 min, a melt index ratio ($I_{21.6}/I_{2.16}$) of at least 30 to about 80, a density of about 0.910 g/cm$^3$ to about 0.940 g/cm$^3$, and an Izod (impact) at 23° C. of about 8 ft-lb/in, about 9 ft-lb/in, about 10 ft-lb/in, or about 11 ft-lb/in to about 12 ft-lb/in, about 13 ft-lb/in, about 14 ft-lb/in, or about 15 ft-lb/in. In some examples, the polyethylene copolymer can have a melt index ($I_{2.16}$) of about 0.2 g/10 min to about 1 g/10 min, a melt index ratio ($I_{21.6}/I_{2.16}$) of at least 30 to about 80, a density of about 0.910 g/cm$^3$ to about 0.940 g/cm$^3$, an Izod (impact) at 23° C. of about 8 ft-lb/in, about 9 ft-lb/in, about 10 ft-lb/in, or about 11 ft-lb/in to about 12 ft-lb/in, about 13 ft-lb/in, about 14 ft-lb/in, or about 15 ft-lb/in, and an Izod (impact) at 0° C. of about 4 ft-lb/in, about 5 ft-lb/in, about 6 ft-lb/in, about 7 ft-lb/in, or about 8 ft-lb/in to about 10 ft-lb/in, about 12 ft-lb/in, about 14 ft-lb/in, or about 16 ft-lb/in. In some examples, the polyethylene copolymer can have a melt index ($I_{2.16}$) of about 0.2 g/10 min to about 1 g/10 min, a melt index ratio ($I_{21.6}/I_{2.16}$) of at least 30 to about 80, a density of about 0.910 g/cm$^3$ to about 0.940 g/cm$^3$, an Izod (impact) at 23° C. of about 8 ft-lb/in, about 9 ft-lb/in, about 10 ft-lb/in, or about 11 ft-lb/in to about 12 ft-lb/in, about 13 ft-lb/in, about 14 ft-lb/in, or about 15 ft-lb/in, an Izod (impact) at 0° C. of about 4 ft-lb/in, about 5 ft-lb/in, about 6 ft-lb/in, about 7 ft-lb/in, or about 8 ft-lb/in to about 10 ft-lb/in, about 12 ft-lb/in, about 14 ft-lb/in, or about 16 ft-lb/in, and a tensile (stress @ yield) of about 10 MPa, about 12 MPa, about 14 MPa, or about 16 MPa to about 18 MPa, about 20 MPa, about 22 MPa, or about 25 MPa.

In some examples, the polyethylene copolymer can have a melt index ($I_{2.16}$) of about 0.2 g/10 min to about 1 g/10 min, a melt index ratio ($I_{21.6}/I_{2.16}$) of at least 30 to about 80, a density of about 0.910 g/cm$^3$ to about 0.940 g/cm$^3$, an Izod (impact) at 23° C. of about 8 ft-lb/in, about 9 ft-lb/in, about 10 ft-lb/in, or about 11 ft-lb/in to about 12 ft-lb/in, about 13 ft-lb/in, about 14 ft-lb/in, or about 15 ft-lb/in, an Izod (impact) at 0° C. of about 4 ft-lb/in, about 5 ft-lb/in, about 6 ft-lb/in, about 7 ft-lb/in, or about 8 ft-lb/in to about 10 ft-lb/in, about 12 ft-lb/in, about 14 ft-lb/in, or about 16 ft-lb/in, a tensile (stress @ yield) of about 10 MPa, about 12 MPa, about 14 MPa, or about 16 MPa to about 18 MPa, about 20 MPa, about 22 MPa, or about 25 MPa, and a shore hardness D of about 45, about 47, about 49, or about 51 to about 53, about 55, about 57, or about 60. In some examples, the polyethylene copolymer can have a melt index ($I_{2.16}$) of about 0.2 g/10 min to about 1 g/10 min, a melt index ratio ($I_{21.6}/I_{2.16}$) of at least 30 to about 80, a density of about 0.910 g/cm$^3$ to about 0.940 g/cm$^3$, an Izod (impact) at 23° C. of about 8 ft-lb/in, about 9 ft-lb/in, about 10 ft-lb/in, or about 11 ft-lb/in to about 12 ft-lb/in, about 13 ft-lb/in, about 14 ft-lb/in, or about 15 ft-lb/in, an Izod (impact) at 0° C. of about 4 ft-lb/in, about 5 ft-lb/in, about 6 ft-lb/in, about 7 ft-lb/in, or about 8 ft-lb/in to about 10 ft-lb/in, about 12 ft-lb/in, about 14 ft-lb/in, or about 16 ft-lb/in, a tensile (stress @ yield) of about 10 MPa, about 12 MPa, about 14 MPa, or about 16 MPa to about 18 MPa, about 20 MPa, about 22 MPa, or about 25 MPa, a shore hardness D of about 45, about 47, about 49, or about 51 to about 53, about 55, about 57, or about 60, and a 1% secant modulus of about 35,000 psi, about 40,000 psi, about 45,000 psi, about 50,000 psi, or about 55,000 psi to about 70,000 psi, about 80,000 psi, about 90,000 psi, about 95,000 psi, or about 100,000 psi.

In some examples, the polyethylene copolymer can have a melt index ($I_{2.16}$) of about 0.2 g/10 min to about 1 g/10 min, a melt index ratio ($I_{21.6}/I_{2.16}$) of at least 30 to about 80, a density of about 0.910 g/cm$^3$ to about 0.940 g/cm$^3$, an Izod (impact) at 23° C. of about 8 ft-lb/in, about 9 ft-lb/in, about 10 ft-lb/in, or about 11 ft-lb/in to about 12 ft-lb/in, about 13 ft-lb/in, about 14 ft-lb/in, or about 15 ft-lb/in, an Izod (impact) at 0° C. of about 4 ft-lb/in, about 5 ft-lb/in, about 6 ft-lb/in, about 7 ft-lb/in, or about 8 ft-lb/in to about 10 ft-lb/in, about 12 ft-lb/in, about 14 ft-lb/in, or about 16 ft-lb/in, a tensile (stress @ yield) of about 10 MPa, about 12 MPa, about 14 MPa, or about 16 MPa to about 18 MPa, about 20 MPa, about 22 MPa, or about 25 MPa, a shore hardness D of about 45, about 47, about 49, or about 51 to about 53, about 55, about 57, or about 60, a 1% secant modulus of about 35,000 psi, about 40,000 psi, about 45,000 psi, about 50,000 psi, or about 55,000 psi to about 70,000 psi, about 80,000 psi, about 90,000 psi, about 95,000 psi, or about 100,000 psi, and a Vicat softening point of about 100° C., about 104° C., about 108° C., or about 112° C. to about 114° C., about 116° C., about 118° C., about 120° C., about 122° C., or about 125° C.

In some examples, the polyethylene copolymer can have a melt index ($I_{2.16}$) of about 0.2 g/10 min to about 1 g/10 min, a melt index ratio ($I_{21.6}/I_{2.16}$) of at least 30 to about 80, a density of about 0.910 g/cm$^3$ to about 0.940 g/cm$^3$, an Izod (impact) at 23° C. of about 8 ft-lb/in, about 9 ft-lb/in, about 10 ft-lb/in, or about 11 ft-lb/in to about 12 ft-lb/in, about 13 ft-lb/in, about 14 ft-lb/in, or about 15 ft-lb/in, an Izod (impact) at 0° C. of about 4 ft-lb/in, about 5 ft-lb/in, about 6 ft-lb/in, about 7 ft-lb/in, or about 8 ft-lb/in to about 10 ft-lb/in, about 12 ft-lb/in, about 14 ft-lb/in, or about 16 ft-lb/in, a tensile (stress @ yield) of about 10 MPa, about 12 MPa, about 14 MPa, or about 16 MPa to about 18 MPa, about 20 MPa, about 22 MPa, or about 25 MPa, a shore hardness D of about 45, about 47, about 49, or about 51 to about 53, about 55, about 57, or about 60, a 1% secant modulus of about 35,000 psi, about 40,000 psi, about 45,000 psi, about 50,000 psi, or about 55,000 psi to about 70,000 psi, about 80,000 psi, about 90,000 psi, about 95,000 psi, or about 100,000 psi, a Vicat softening point of about 100° C., about 104° C., about 108° C., or about 112° C. to about 114° C., about 116° C., about 118° C., about 120° C., about 122° C., or about 125° C., and a second melting temperature of about 110° C., about 112° C., about 113° C., or about 115° C. to about 117° C., about 119° C., about 121° C., about 123° C., about 125° C., or about 127° C.

The Izod (impact) at 23° C. of the polyethylene copolymer can be measured according to ASTM D256-10(2018), Method A. The Izod (impact) at 0° C. of the polyethylene copolymer can be measured according to ASTM D256-10 (2018). In some examples, the environmental stress crack resistance (ESCR) of the polyethylene copolymer can be measured ASTM D-1693-15, Condition A, 100% IGEPAL® F50. In some examples, the notched, constant ligament-stress (NCLS) of the polyethylene copolymer can be measured under the following conditions: 50° C., 600 psi, and 10% IGEPAL® F50. The tensile strength at yield of the polyethylene copolymer can be measured according to ASTM D638-14. The shore hardness of the polyethylene copolymer can be measured according to ASTM D 2240-15e1. The average flexural modulus (average 1% Secant Modulus) at 0.05 in/min of the polyethylene copolymer can be measured according to ASTM D790-17, Procedure A. The Vicat softening point of the polyethylene copolymer can be measured according to ASTM D1525-17e1, 10N at 50° C./hr.

The second melting temperature ($T_{m2}$) of the polyethylene copolymer can be determined by first pressing a sample of the composition at elevated temperature and removing the sample with a punch die. The sample is then annealed at room temperature. After annealing, the sample is placed in a differential scanning calorimeter, e.g., Perkin Elmer 7 Series Thermal Analysis System, and cooled. Then the sample is heated to a final temperature and the first melting temperature ($T_{m1}$) is recorded as the temperature of the greatest heat absorption within the range of melting of the sample. The sample is cooled and reheated to form a second melt, which is more reproducible than the first melt. The peak melting temperature from the second melt is recorded as the second melting temperature.

In some examples, the polyethylene copolymer can have a haze value of less than 20%, less than 18%, less than 16%, less than 14%, less than 12%, or less than 11%. In other examples, the polyethylene copolymer can have a have value of about 5% to less than 20%, about 8% to 18%, about 9% to about 12%, about 10% to about 14%, or about 7% to less than 20%. The haze value can be measured according to ASTM D-1003-95.

Extrusion Blow Molding Process

Articles that include the polyethylene copolymer can be produced via extrusion blow molding, a process well-known in the art. Extrusion blow molding typically includes a cycle of steps. In some examples, the steps in extrusion blow molding can include, but are not limited to, extruding a polymer composition, e.g., the polyethylene copolymer, to produce a hollow tube or parison, closing a mold around the parison, inflating the parison so that it takes the shape of the mold cavity, and opening the mold to remove the article therefrom. As the mold closes around the parison the top of the parison can be pinched and the bottom of the parison can be sealed around a metal blow pin as the two halves of the mold come together. A fluid, e.g., air or nitrogen, can be injected into the parison within the mold, e.g., via the mandrel or a needle, to inflate the parison against an inner surface of the mold to form the article. In typical extrusion blow molding processes the sequence can be automated and usually integrated with downstream operations such as bottle filling and labeling. The extrusion blow molding can be a continuous (constant extrusion of the parison) or intermittent, which are both well-known processes.

The extrusion blow molded article can be a single layer article or a multi-layer article. In other words, the polyethylene copolymer can be extruded or co-extruded to produce a single layer parison or a multi-layer parison that can be inflated within the mold to produce a single layer article or a multi-layer article, respectively. In some examples, the extrusion blow molded article can include 1, 2, 3, 4, 5, 6, or 7 layers. In some examples, an inner surface of the article, an outer surface of the article, or both the inner surface and the outer surface can be composed of the polyethylene copolymer and can have an average gloss of at least 40. In some examples, the article can be a 2 layer article with the inner layer composed of a high density polyethylene and the outer layer composed of the polyethylene copolymer, with the outer layer having an average gloss of at least 40.

If the polyethylene copolymer is co-extruded, the polyethylene copolymer can be co-extruded with one or more additional layers of the polyethylene copolymer and/or one or more layers of: high density polyethylene, medium density polyethylene, low density polyethylene, linear low density polyethylene, polypropylene, propylene copolymers, co-polyester, polyethylene terephthalate, polyvinyl chloride, nylon, ethylene vinyl acetate, thermoplastic elastomers, cyclic olefin polymers, polycarbonates, acrylonitrile butadiene styrene polymers, and the like.

In some examples, the at least one surface of the article, i.e., the inner surface, the outer surface, or both the inner surface and outer surface, can have an average gloss of at least 40, at least 40.5, at least 41, at least 41.5, at least 42, at least 42.5, at least 43, at least 43.5, or at least 44 to about 50, about 55, about 60, about 65, about 70, about 75, or about 80. In some examples, the at least one surface of the article can have a gloss in the machine direction of at least 40, at least 40.5, at least 41, at least 41.5, at least 42, at least 42.5, at least 43, at least 43.5, or at least 44 to about 50, about 55, about 60, about 65, about 70, about 75, or about 80. In other examples, the at least one surface of the article can have a gloss in the transverse direction of at least 38, at least 38.5, at least 39, at least 39.5, at least 40, at least 40.5, at least 41, at least 41.5, at least 42, at least 42.5, at least 43, or at least 44 to about 50, about 55, about 60, about 65, about 70, about 75, or about 80.

In some examples, the at least one surface of the article can have a gloss in the machine direction of at least 40, at least 40.5, at least 41, at least 41.5, at least 42, at least 42.5, at least 43, at least 43.5, or at least 44 to about 50, about 55, about 60, about 65, about 70, about 75, or about 80, a gloss in the transverse direction of at least 38, at least 38.5, at least 39, at least 39.5, at least 40, at least 40.5, at least 41, at least 41.5, at least 42, at least 42.5, at least 43, or at least 44 to about 50, about 55, about 60, about 65, about 70, about 75, or about 80, and an average gloss of at least 40, at least 40.5, at least 41, at least 41.5, at least 42, at least 42.5, at least 43, at least 43.5, or at least 44 to about 50, about 55, about 60, about 65, about 70, about 75, or about 80.

It should be understood, that if the article includes two or more layers composed of different polymers, at least one of the inner surface and the outer surface of the article can be composed of the polyethylene copolymer derived from ethylene and at least one $C_3$ to $C_{20}$ α-olefin and having an $I_{2.16}$ (190° C./2.16 kg) of 0.2 g/10 min to 1 g/10 min, a melt index ratio of 30 to 80, and a density of 0.910 g/cm$^3$ to 0.940 g/cm$^3$, and the surface composed of the polyethylene copolymer can have an average gloss and a gloss in the machine direction of at least 40, e.g., at least 40 to about 50, when the surface has a roughness (Ra) of less than 3 μm, less than 2.5 μm, less than 2 μm, less than 1.5 μm, and less than 1 μm.

The extrusion blow molded article can have an average wall thickness of about 0.025 mm, about 0.035 mm, about 0.04 mm, about 0.07 mm, about 0.1 mm, about 0.3 mm, about 0.5 mm, about 0.7 mm, or about 1 mm to about to about 1.3 mm, about 1.5 mm, about 1.7 mm, about 1 mm, about 2 mm, about 2.3 mm, about 2.5 mm, about 2.7 mm, or about 3 mm.

The extrusion blow molded article can be any of a number of a variety of items. Illustrative extrusion blow molded articles that can be produced by extrusion blow molding and have at least one layer, e.g., an inner layer and/or an outer layer, composed of the polyethylene copolymer can include, but are not limited to, industrial bulk containers; lawn, garden and household items; medical supplies and parts; toys; building industry products; automotive-under the hood parts; and appliance components.

Processes for Making the Polyethylene Copolymer

The polyethylene copolymer can be made via any suitable polymerization method, e.g., gas phase, solution, or slurry polymerization processes. In some examples, the polyethylene can be made via a continuous gas phase polymerization using supported catalyst that can include an activated molecularly discrete catalyst in the substantial absence of an aluminum alkyl based scavenger, e.g., triethylaluminum (TEAL), trimethylaluminum (TMAL), triisobutyl aluminum (TIBAL), tri-n-hexylaluminum (TNHAL), and the like).

In some examples, a zirconium transition metal metallo-cene-type catalyst system can be used. Suitable metallocene catalysts and catalyst systems that can be used to produce the polyethylene copolymer can include, but are not limited to, those disclosed in U.S. Pat. Nos. 5,466,649, 6,476,171, 6,225,426, and 7,951,873. In at least one example, the catalyst system can be or can include a supported dimeth-ylsilyl bis(tetrahydroindenyl) zirconium dichloride catalyst.

In some examples a supported polymerization catalyst can be deposited on, bonded to, contacted with, incorporated within, adsorbed or absorbed in, on, or otherwise contacted with a support or carrier. The metallocene catalyst can be introduced onto a support by slurrying a pre-supported activator in oil, a hydrocarbon such as pentane, solvent, or non-solvent, and then adding the metallocene as a solid while stirring. The metallocene can be in the form of finely divided solids. Although the metallocene is typically of very low solubility in the diluting medium, it is found to distrib-ute onto the support and be active for polymerization. Very low solubilizing media such as a mineral oil or pentane can be used. The diluent can be filtered off and the remaining solid shows polymerization capability much as would be expected if the catalyst had been prepared by traditional methods such as by contacting the catalyst with methylalu-moxane in toluene, contacting with the support, followed by removal of the solvent. If the diluent is volatile, such as pentane, it may be removed under vacuum or by nitrogen purge to afford an active catalyst. The mixing time can be greater than 4 hours, but shorter times are suitable.

In the gas phase polymerization process, a continuous cycle can be employed where in one part of the cycle of a reactor, a cycling gas stream, otherwise known as a recycle stream or fluidizing medium, can be heated in the reactor by the heat of polymerization. The heat can be removed in another part of the cycle by a cooling system external to the reactor. Illustrative processes can include those disclosed in U.S. Pat. Nos. 4,543,399; 4,588,790; 5,028,670; 5,317,036; 5,352,749; 5,405,922; 5,436,304; 5,453,471; 5,462,999; 5,616,661; and 5,668,228.

In a gas fluidized bed process for producing the polyeth-ylene copolymer, a gaseous stream containing the ethylene and comonomer can be cycled through a fluidized bed in the presence of the catalyst under reactive conditions. The gaseous stream can be withdrawn from the fluidized bed and recycled back into the reactor. The polyethylene copolymer product can be withdrawn from the reactor and fresh mono-mer can be added to replace the polymerized monomers. The reactor pressure can vary from about 650 kPag, about 1,350 kPag, or about 1,750 kPa to about 2,400 kPag, about 2,800 kPag, or about 3,500 kPag. The reactor can be operated at a temperature of about 60° C., about 70° C., about 80° C., or about 90° C. to about 95° C., about 105° C., about 110° C., about 115° C., or about 120° C. The productivity of the catalyst or catalyst system can be influenced by the ethylene monomer partial pressure. The mole percent of the ethylene monomer can be from about 25 mol %, about 50 mol %, or about 70 mol % to about 80 mol %, about 85 mol %, or about 90 mol %. The ethylene partial pressure can be about 500 kPa-absolute, about 700 kPa-absolute, or about 1,000 kPa-absolute to about 1,700 kPa-absolute, about 1,850 kPa-absolute, or about 2,100 kPa-absolute.

Other gas phase processes that can be used to produce the polyethylene copolymer can include, but are not limited to, those disclosed in U.S. Pat. Nos. 5,627,242, 5,665,818 and 5,677,375; EP0794200A; EP0802202A; and EPB0634421.

In some examples, it can be beneficial in slurry or gas phase processes to operate in the substantial absence of, or essentially free of, any scavengers, such as triethylalumi-num, trimethylaluminum, triisobutylaluminum, and tri-n-hexylaluminum and diethyl aluminum chloride and the like. Such processes are described in PCT Publication No. WO 96/08520, which is herein fully incorporated by reference.

In some examples, the use of a process continuity aid, while not required, can be employed in any of the foregoing processes. Such continuity aids are well known to persons of skill in the art and include, for example, metal stearates.

In other examples, the polyethylene copolymer can be produced according to the conditions disclosed in U.S. Pat. No. 5,763,543. In some examples, the a catalyst system in which the metallocene has a pair of bridged cyclopentadi-enyl groups, preferably with the bridge including a single carbon, germanium, or silicon atom can be used so as to provide an open site on the catalytically active cation. The activator can be methyl alumoxane as disclosed in U.S. Pat. Nos. 5,324,800; 5,580,939; and 5,633,394; EP0129368; or a non-coordinated anion as disclosed in EP0277004. In some examples, there can be substantially no scavenger(s) which may interfere with the reaction between the vinyl end unsaturation of polymers formed and the open active site on the cation. By the statement "substantially no scavengers"

and "substantially devoid or free of Lewis acid scavengers", it is meant that there should be less than 100 ppm by weight of such scavengers present in the feed gas, or preferably, no intentionally added scavenger, e.g., an aluminum alkyl scavenger, other than that which may be present on the support.

The conditions for the production of the polyethylene copolymer can also include steady state polymerization conditions. As such, in some examples, the polyethylene copolymer can be produced via a continuous gas phase process. For example, the polyethylene copolymer can be produced by continuously circulating a feed gas stream containing monomers and inerts to thereby fluidize and agitate a bed of polymer particles, adding metallocene catalyst to the bed and removing polymer particles therefrom. The catalyst can include at least one bridged bis cyclopentadienyl transition metal and an alumoxane activator on a common or separate porous support. The feed gas can be substantially devoid of a Lewis acidic scavenger and wherein any Lewis acidic scavenger is preferably present in an amount less than 100 wt. ppm of the feed gas. The temperature in the bed can be no more than 20° C. less than the polyethylene copolymer melting temperature as determined by DSC at an ethylene partial pressure in excess of 414 kPa-absolute. The removed polyethylene copolymer particles can have an ash content of transition metal of less than 500 wppm. The polyethylene copolymer can have substantially no detectable chain end unsaturation as determined by HNMR, i.e., the polyethylene copolymer can have a vinyl unsaturation of less than 0.1 vinyl groups per 1,000 carbon atoms in the polyethylene copolymer, e.g., less than 0.05 vinyl groups per 1,000 carbon atoms or 0.01 vinyl groups per 1000 carbon atoms or less.

In some examples, the process can produce the polyethylene copolymer via the use of a single catalyst and the process does not depend on the interaction of bridged and unbridged species. In some examples, the catalyst can be substantially devoid of a metallocene having a pair of pi bonded ligands, e.g., cyclopentadienyl compounds, which are not connected through a covalent bridge. In other words, in some examples, the polyethylene copolymer can be produced with a single metallocene species that includes a pair of pi bonded ligands at least one of which has a structure with at least two cyclic fused rings, e.g., indenyl rings. In some examples, the single metallocene species can include a monoatom silicon bridge connecting two polynuclear ligands pi bonded to the transition metal atom.

In some examples, the catalyst can be supported on silica with the catalyst homogeneously distributed in the silica pores. In some examples, a fairly small amount of methyl alumoxane can be used such as an amounts providing an Al to transition metal ratio of about 400 to about 30 or about 200 to 50.

In some examples, the molar ratio of the ethylene and comonomer can be varied to produce the polyethylene copolymer having a desired melt index ratio. In some examples, controlling the temperature within the polymerization reactor can help control the melt index. In some examples, the overall monomer partial pressures can also be used, which corresponds to conventional practice for gas phase polymerization of LLDPE.

It should be understood that one or more additives can be added to the polyethylene copolymer during palletization/compounding of the polyethylene copolymer. Illustrative additives can be or can include, but are not limited to, one or more stabilization agents such as antioxidants or other heat or light stabilizers; one or more anti-static agents; one or more crosslink agents or co-agents; one or more crosslink promoters; one or more release agents; one or more adhesion promoters; one or more plasticizers; one or more anti-agglomeration agents, such as oleamide, stearamide, erucamide or other derivatives with the same activity as known to the person skilled in the art; or any other additive and derivatives known in the art.

EXAMPLES

The foregoing discussion can be further described with reference to the following non-limiting examples.

Four inventive bottles (Ex. 1-Ex.-4) and one comparative bottle (CEx.) were produced by extrusion blow molding. The polyethylene copolymers used to produce the bottles in Ex. 1-Ex. 4 and were produced with a metallocene catalyst. The α-olefin comonomer used to produce the polyethylene copolymers in Ex. 1-Ex. 4 was 1-hexene. The polyethylene copolymer used to produce the bottle in the CEx. was a high density polyethylene copolymer sold under the name PAXON® AL55-003 by ExxonMobil.

The polyethylene copolymers were extrusion blow molded according to the following procedure. The blow molding process began by melting down the polyethylene copolymers at a temperature of about 200° C. to about 250° C. The melted polyethylene copolymers were formed into parisons. The parison was clamped into a cooled mold, e.g., the mold was at a temperature of about 30° C. to about 50° C., and compressed air was blown into the mold. The air pressure, e.g., about 80 psi to about 90 psi, pushed the walls of the parison outward and into contact with an inner surface of the mold. Once the polyethylene copolymers cooled and hardened the mold was opened and the article was ejected therefrom.

The properties of each polyethylene copolymer used in Examples 1-4 and the gloss and wall thickness of the bottles made with each polyethylene copolymer are shown in Tables 1-4 below. The surface roughness values measured for Ex. 1, Ex. 3 and CEx. are shown in Table 5 below.

TABLE 1

| Example | $I_{2.16}$ (g/10 min) | $I_{21.6}/I_{2.16}$ | Density (g/cm³) | Vicat 10N @ 50 C./hr, ASTM-D1525 | Shore Hardness D | DSC 2nd melt (° C.) | Izod ASTM D256, Method A @ 23 C. (Ft-lb/in) |
|---|---|---|---|---|---|---|---|
| Ex. 1 | 1.00 | 34.00 | 0.920 | 104.57 | 47.60 | 113.5 | 10.9 |
| Ex. 2 | 0.50 | | 0.923 | | | | |
| Ex. 3 | 0.29 | 54.70 | 0.928 | 114.36 | 51.16 | 119.4 | 13.0 |
| Ex. 4 | 0.25 | 64.00 | 0.939 | 121.47 | 56.76 | 126.4 | 13.4 |
| CEx. | 0.30 | | 0.954 | 127.22 | | | |

TABLE 2

| Example | Izod ASTM D256, Method A @ 0 C. (ft-lb/in) | 1% Secant @ 0.05 in/min (psi) (ASTM D790, Proc. A) | Tensile @ 2 in/min (ASTM D638) Stress @ yield (MPa) | ESCR (10% Igepal) (ASTM D1693 Cond A) (hrs) | ESCR (100% Igepal) (ASTM D1693, Cond A) (hrs) | NCLS (10% Igepal, 50 C., 600 psi) |
|---|---|---|---|---|---|---|
| Ex. 1 | | 41400 | 12.10 | 1008 | 1008 | 1003 |
| Ex. 2 | | | | | | |
| Ex. 3 | 14.57 | 63200 | 15.80 | 1008 | 1008 | 1003 |
| Ex. 4 | 6.06 | 94000 | 21.90 | 1008 | 1008 | 1192 |
| CEx. | | | | | 30 | |

TABLE 3

| Example | Gloss (MD) | Gloss (TD) | Avg. Gloss |
|---|---|---|---|
| Ex. 1 | 44.20 | 42.90 | 43.60 |
| Ex. 2 | 46.30 | 45.50 | 45.90 |
| Ex. 3 | 44.80 | 47.30 | 46.10 |
| Ex. 4 | 41.40 | 38.60 | 40.00 |
| CEx. | 28.00 | 28.80 | 28.40 |

TABLE 4

| Gauge Mic (mils) | Method Used | Ex. 1 | Ex. 2 | Ex. 3 | Ex. 4 | CEx. |
|---|---|---|---|---|---|---|
| Average | ASTM D6988 | 25.70 | 25.92 | 24.50 | 26.04 | 30.93 |
| Low | | 22.66 | 21.90 | 21.36 | 22.75 | 26.01 |
| High | | 31.80 | 32.94 | 30.59 | 30.86 | 35.65 |

TABLE 5

| Example | Ra (μm) |
|---|---|
| Ex. 1 | 0.957 |
| Ex. 2 | — |
| Ex. 3 | 1.915 |
| Ex. 4 | — |
| CEx. | 4.343 |

As discussed above, the bottles produced by extrusion blow molding the polyethylene copolymer having an $I_{2.16}$ (190° C./2.16 kg) of 0.2 g/10 min to 1 g/10 min, a melt index ratio of 30 to 80, and a density of 0.910 g/cm$^3$ to 0.940 g/cm$^3$, surprisingly and unexpectedly had a gloss in the machine direction of at least 40 and an average gloss of at least 40. The bottle in Ex. 1 had a surface roughness (Ra) of about 957 nm and the bottle in Ex. 3 had a surface roughness (Ra) of about 1.91 μm. The bottle in CEx. 1 had a surface roughness of about 4.34 μm.

The gloss values of the extrusion blow molded article shown in Table 3 above were measured using a BYK Gardner Micro-Gloss 45° Reflectometer Model 4535 with a Gardner Gloss meter Calibration Primary Working Standard (S/N 1045268) according to ASTM D2457-13, with the following modifications made to ASTM D2457-13: bottle wall thickness ranged from 21 mils to 36 mils. Three specimen samples per bottle were cut out into a 5×5 inch section and mounted flat to the black felt background. Sample mode was used to measure the three specimens per bottle in both the machine direction (MD) and the transverse directions (TD) direction. The mean of each of the three bottle surface measurements was reported in both MD and TD orientations.

LISTING OF EMBODIMENTS

This disclosure may further include the following non-limiting embodiments.

1. An article comprising a polyethylene copolymer derived from ethylene and at least one C$_3$ to C$_{20}$ α-olefin, wherein the polyethylene copolymer has: an $I_{2.16}$ (190° C./2.16 kg) of 0.2 g/10 min to 1 g/10 min, a melt index ratio of 30 to 80, and a density of 0.910 g/cm$^3$ to 0.940 g/cm$^3$, wherein the article is formed by extrusion blow-molding the polyethylene copolymer, and wherein at least one surface of the article has an average gloss of at least 40.

2. A process for making an article, comprising: extruding a polymer composition to produce a parison; closing a mold around the parison; injecting a fluid into the mold to inflate the parison against an inner surface of the mold to form the article; and removing the article from the mold, wherein the polymer composition comprises a polyethylene copolymer derived from ethylene and at least one C$_3$ to C$_{20}$ α-olefin, wherein the polyethylene copolymer has: an $I_{2.16}$ (190° C./2.16 kg) of 0.2 g/10 min to 1 g/10 min, a melt index ratio of 30 to 80, and a density of 0.910 g/cm$^3$ to 0.940 g/cm$^3$; and wherein at least one surface of the article has an average gloss of at least 40.

3. The article or process of paragraph 1 or 2, wherein the polyethylene copolymer is produced with a metallocene catalyst.

4. The article or process of any of paragraphs 1 to 3, wherein the article is formed from a single layer of the polymer composition.

5. The article or process of any of paragraphs 1 to 4, wherein the article is formed from at least two layers, wherein at least one of the layers comprises the polyethylene copolymer, and wherein the at least one surface having the gloss of at least 40 comprises a surface of the layer comprising the polyethylene copolymer.

6. The article or process of any of paragraphs 1 to 5, wherein the article is a container having an average wall thickness of about 0.025 mm to about 3 mm.

7. The article or process of any of paragraphs 1 to 6, wherein the polyethylene copolymer has a compositional distribution breadth index of at least 70%.

8. The article or process of any of paragraphs 1 to 7, wherein the polyethylene copolymer has a haze value of less than 20%.

9. The article or process of any of paragraphs 1 to 8, wherein the polyethylene copolymer has a density of less than 0.925 g/cm$^3$.

10. The article or process of any of paragraphs 1 to 9, wherein the $I_{2.16}$ (190° C./2.16 kg) of the polyethylene copolymer is less than 0.5 g/10 min.

11. The article or process of any of paragraphs 1 to 10, wherein the $I_{2.16}$ (190° C./2.16 kg) of the polyethylene copolymer is less than 0.5 g/10 min and the density of the polyethylene copolymer is at least 0.925 g/cm³.

12. The article or process of any of paragraphs 1 to 11, wherein the $I_{2.16}$ (190° C./2.16 kg) of the polyethylene copolymer is 1 g/10 min or less and the density of the polyethylene copolymer is less than 0.925 g/cm³.

13. The article or process according to any of paragraphs 1 to 12, wherein a relationship between the 1% secant modulus (M) and the dart impact strength (DIS) of the polyethylene copolymer complies with the formula: DIS$\geq$0.8$\times$[100+e$^{(11.71-0.000268M+2.183\times10^{-9}\times M^2)}$], wherein e is the base Napierian logarithm, M is the averaged modulus in psi of the polyethylene copolymer, and DIS is the 26 inch dart impact strength in g/mil of the polyethylene copolymer.

14. The article or process according to any of paragraphs 1 to 13, wherein a relationship between the 1% secant modulus (M) and the dart impact strength (DIS) of the polyethylene copolymer complies with the formula: DIS$\geq$2.0$\times$[100+e$^{(11.71-0.000268M+2.183\times10^{-9}\times M^2)}$], wherein e is the base Napierian logarithm, M is the averaged Modulus in psi of the polyethylene copolymer, and DIS is the 26 inch dart impact strength in g/mil of the polyethylene copolymer.

15. The article or process according to any of paragraphs 1 to 14, wherein the $I_{2.16}$ (190° C./2.16 kg) of the polyethylene copolymer is about 1 g/10 min, the density of the polyethylene copolymer is less than 0.923 g/cm³, and the melt index ratio of the polyethylene copolymer is about 33 to about 35.

16. The article or process according to any of paragraphs 1 to 14, wherein the $I_{2.16}$ (190° C./2.16 kg) of the polyethylene copolymer is about 0.28 g/10 min to about 0.31 g/10 min, the density of the polyethylene copolymer is less than 0.923 g/cm³, and the melt index ratio of the polyethylene copolymer is greater than 50.

17. The article or process according to any of paragraphs 1 to 14, wherein the $I_{2.16}$ (190° C./2.16 kg) of the polyethylene copolymer is about 0.23 g/10 min to about 0.27 g/10 min, the density of the polyethylene copolymer is about 0.940 g/cm³, and the melt index ratio of the polyethylene copolymer is greater than 60.

18. The article or process according to any of paragraphs 1 to 14, wherein the $I_{2.16}$ (190° C./2.16 kg) of the polyethylene copolymer is about 0.4 g/10 min to about 0.6, the density of the polyethylene copolymer is less than 0.922 g/cm³, and the melt index ratio of the polyethylene copolymer is greater than 30.

19. The article or process according to any of paragraphs 1 to 14, wherein the $I_{2.16}$ (190° C./2.16 kg) of the polyethylene copolymer is about 0.25 g/10 min to about 0.35, the density of the polyethylene copolymer is less than 0.930 g/cm³, and the melt index ratio of the polyethylene copolymer is greater than 30.

20. The article or process according to any of paragraphs 1 to 14, wherein the $I_{2.16}$ (190° C./2.16 kg) of the polyethylene copolymer is about 0.22 g/10 min to about 0.27, the density of the polyethylene copolymer is about 0.940 g/cm³, and the melt index ratio of the polyethylene copolymer is greater than 35.

21. The article or process according to any of paragraphs 1 to 20, wherein the at least one surface of the article has an average gloss of at least 41.

22. The article or process according to any of paragraphs 1 to 21, wherein the at least one surface of the article has an average gloss of at least 42.

23. The article or process according to any of paragraphs 1 to 22, wherein the at least one surface of the article has an average gloss of at least 43.

24. The article or process according to any of paragraphs 1 to 23, wherein the at least one surface of the article has an average gloss of at least 44.

25. The article or process according to any of paragraphs 1 to 24, wherein the at least one surface of the article has an average gloss of at least 45.

26. The article or process according to any of paragraphs 1 to 25, wherein the at least one surface of the article has an average gloss of at least 46.

27. The article or process according to any of paragraphs 1 to 26, wherein the at least one surface of the article has an average gloss of up to about 80.

28. The article or process according to any of paragraphs 1 to 27, wherein the at least one surface of the article has an average gloss of up to about 70.

29. The article or process according to any of paragraphs 1 to 27, wherein the at least one surface of the article has an average gloss of up to about 60.

30. The article or process according to any of paragraphs 1 to 27, wherein the at least one surface of the article has an average gloss of up to about 50.

31. The article or process according to any of paragraphs 1 to 30, wherein the polyethylene copolymer has an Izod (impact) at 23° C. of about 8 ft-lb/in to about 15 ft-lb/in.

32. The article or process according to any of paragraphs 1 to 31, wherein the polyethylene copolymer has an Izod (impact) at 0° C. of about 4 ft-lb/in to about 16 ft-lb/in.

33. The article or process according to any of paragraphs 1 to 32, wherein the polyethylene copolymer has a tensile (stress @ yield) of about 10 MPa to about 25 MPa.

34. The article or process according to any of paragraphs 1 to 33, wherein the polyethylene copolymer has a shore hardness D of about 45 to about 60.

35. The article or process according to any of paragraphs 1 to 34, wherein the polyethylene copolymer has a 1% secant modulus of about 35,000 psi to about 100,000 psi.

36. The article or process according to any of paragraphs 1 to 35, wherein the polyethylene copolymer has a Vicat softening point of about 100° C. to about 125° C.

37. The article or process according to any of paragraphs 1 to 36, wherein the polyethylene copolymer has a second melting temperature of about 110° C. to about 127° C.

38. The article or process according to any of paragraphs 1 to 37, wherein the polyethylene copolymer has a molecular weight distribution of about 2 to about 6.5.

39. The article or process according to any of paragraphs 1 or 3 to 38, wherein the at least one surface of the article has a surface roughness (Ra) of less than 3 μm.

40. The article or process according to any of paragraphs 1 to 39, wherein the at least one surface of the article has a surface roughness (Ra) of about 0.1 μm to less than 3 μm.

41. The article or process according to any of paragraphs 1 to 40, wherein the at least one surface of the article has a surface roughness (Ra) of less than 2.5 μm.

42. The article or process according to any of paragraphs 1 to 41, wherein the at least one surface of the article has a surface roughness (Ra) of less than 2 μm.

43. The article or process according to any of paragraphs 1 to 42, wherein the at least one surface of the article has a surface roughness (Ra) of less than 1.5 μm.

44. The article or process according to any of paragraphs 1 to 43, wherein the at least one surface of the article has a surface roughness (Ra) of less than 1 μm.

Unless otherwise indicated, all numbers indicating quantities in this disclosure are to be understood as being modified by the term "about" in all instances. It should also be understood that the precise numerical values used in the specification and claims constitute specific embodiments. Efforts have been made to ensure the accuracy of the data in the examples. However, it should be understood that any measured data inherently contains a certain level of error due to the limitation of the technique and/or equipment used for making the measurement.

Certain embodiments and features are described herein using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow

What is claimed is:

1. An article comprising a polyethylene copolymer derived from ethylene and at least one $C_3$ to $C_{20}$ α-olefin, wherein the polyethylene copolymer has:
    an $I_{2.16}$ (190° C./2.16 kg) of 0.2 g/10 min to 1 g/10 min,
    a melt index ratio of 30 to 80, and
    a density of 0.910 g/cm³ to 0.940 g/cm³,
    wherein the article is formed by extrusion blow-molding the polyethylene copolymer,
    wherein at least one surface of the article has an average gloss of at least 40, and
    wherein the polyethylene copolymer has: an Izod impact at 23° C. (measured according to ASTM D256-10 (2018), Method A) in a range of from 8 ft-lb/in. to 15 ft-lb/in.; an Izod impact at 0° C. (measured according to ASTM D256-10 (2018), Method A) in a range of from 4 ft-lb/in. to 16 ft-lb/in.; a Shore hardness D (measured according to ASTM D 2240-15el) in a range of from 45 to 60; or a combination thereof.

2. The article of claim 1, wherein the polyethylene copolymer is produced with a metallocene catalyst.

3. The article of claim 1, wherein the article is formed from a single layer of the polymer composition.

4. The article of claim 1, wherein the article is formed from at least two layers, wherein at least one of the layers comprises the polyethylene copolymer, and wherein the at least one surface having the gloss of at least 40 is the surface of the layer comprising the polyethylene copolymer.

5. The article of claim 1, wherein the article is a container having an average wall thickness of about 1 mm to about 3 mm.

6. The article of claim 1, wherein the at least one surface of the article has a surface roughness (Ra) of less than 3 μm.

7. The article of claim 1, wherein the polyethylene copolymer has one or more of the following properties:

a haze value of less than 20%;
    a density of less than 0.925 g/cm³; and
    an $I_{2.16}$ (190° C./2.16 kg) less than 0.5 g/10 min.

8. The article of claim 7, wherein the $I_{2.16}$ (190° C./2.16 kg) of the polyethylene copolymer is less than 0.5 g/10 min and the density of the polyethylene copolymer is at least 0.925 g/cm³.

9. The article of claim 1, wherein the $I_{2.16}$ (190° C./2.16 kg) of the polyethylene copolymer is 1 g/10 min or less and the density of the polyethylene copolymer is less than 0.925 g/cm³.

10. A process for making an article, comprising:
    extruding a polymer composition to produce a parison;
    closing a mold around the parison;
    injecting a fluid into the mold to inflate the parison against an inner surface of the mold to form the article; and
    removing the article from the mold, wherein the polymer composition comprises a polyethylene copolymer derived from ethylene and at least one $C_3$ to $C_{20}$ α-olefin, wherein the polyethylene copolymer has:
    an $I_{2.16}$ (190° C./2.16 kg) of 0.2 g/10 min to 1 g/10 min,
    a melt index ratio of 30 to 80, and
    a density of 0.910 g/cm³ to 0.940 g/cm³;
    wherein at least one surface of the article has an average gloss of at least 40; and
    wherein the polyethylene copolymer has: an Izod impact at 23° C. (measured according to ASTM D256-10 (2018), Method A) in a range of from 8 ft-lb/in. to 15 ft-lb/in.; an Izod impact at 0° C. (measured according to ASTM D256-10 (2018), Method A) in a range of from 4 ft-lb/in. to 16 ft-lb/in.; a Shore hardness D (measured according to ASTM D 2240-15el) in a range of from 45 to 60; or a combination thereof.

11. The process of claim 10, wherein the polyethylene copolymer is produced with a metallocene catalyst.

12. The process of claim 10, wherein the article is formed from a single layer of the polymer composition.

13. The process of claim 10, wherein the article is formed from at least two layers, wherein at least one of the layers comprises the polyethylene copolymer, and wherein the at least one surface having the gloss of at least 40 comprises the polyethylene copolymer.

14. The process of claim 10, wherein the at least one surface of the article has a surface roughness (Ra) of less than 3 μm.

15. The process of claim 10, wherein the polyethylene copolymer has one or both of the following properties:
    a haze value of less than 20%;
    a density of less than 0.925 g/cm³; and
    an $I_{2.16}$ (190° C./2.16 kg) of less than 0.5 g/10 min.

16. The process of claim 15, wherein the $I_{2.16}$ (190° C./2.16 kg) of the polyethylene copolymer is less than 0.5 g/10 min and the density of the polyethylene copolymer is at least 0.925 g/cm³.

17. The process of claim 10, wherein the $I_{2.16}$ (190° C./2.16 kg) of the polyethylene copolymer is 1 g/10 min or less and the density of the polyethylene copolymer is less than 0.925 g/cm³.

18. The process of claim 10, wherein the article is a container having an average wall thickness of about 1 mm to about 3 mm.

* * * * *